United States Patent
Ishizuka et al.

(10) Patent No.: US 11,254,813 B2
(45) Date of Patent: Feb. 22, 2022

(54) MOLDED ARTICLE AND METHOD OF PRODUCING THE SAME

(71) Applicant: SUMITOMO CHEMICAL COMPANY, LIMITED, Tokyo (JP)

(72) Inventors: Kenta Ishizuka, Ichihara (JP); Nao Inoue, Ichihara (JP); Akinori Bando, Tsukuba (JP); Yoshinori Sato, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 273 days.

(21) Appl. No.: 16/475,463

(22) PCT Filed: Jan. 23, 2018

(86) PCT No.: PCT/JP2018/002011
§ 371 (c)(1),
(2) Date: Jul. 2, 2019

(87) PCT Pub. No.: WO2018/139459
PCT Pub. Date: Aug. 2, 2018

(65) Prior Publication Data
US 2019/0322856 A1    Oct. 24, 2019

(30) Foreign Application Priority Data

Jan. 27, 2017  (JP) .............................. JP2017-012845

(51) Int. Cl.
| | | |
|---|---|---|
| *C08L 33/10* | (2006.01) | |
| *C08L 33/08* | (2006.01) | |
| *B29C 55/02* | (2006.01) | |
| *C08F 2/44* | (2006.01) | |
| *C08F 20/18* | (2006.01) | |
| *C08K 3/36* | (2006.01) | |
| *B29K 33/00* | (2006.01) | |

(52) U.S. Cl.
CPC .............. *C08L 33/10* (2013.01); *B29C 55/02* (2013.01); *C08F 2/44* (2013.01); *C08F 20/18* (2013.01); *C08K 3/36* (2013.01); *C08L 33/08* (2013.01); *B29K 2033/08* (2013.01); *B29K 2033/12* (2013.01); *C08K 2201/003* (2013.01)

(58) Field of Classification Search
CPC .......... C08L 33/10; C08L 33/08; B29C 55/02; B29K 2033/12; C08F 20/18; C08F 2/44; C08K 3/36
See application file for complete search history.

(56) References Cited

U.S. PATENT DOCUMENTS

| | | | |
|---|---|---|---|
| 2011/0046331 A1* | 2/2011 | Langerbeins | ........ C08K 5/0025 526/262 |
| 2012/0322943 A1 | 12/2012 | Siol et al. | |
| 2015/0218350 A1 | 8/2015 | Honma et al. | |
| 2016/0264771 A1 | 9/2016 | Watanabe | |

FOREIGN PATENT DOCUMENTS

| | | |
|---|---|---|
| CN | 102358032 B | 4/2014 |
| CN | 102007153 B | 11/2014 |
| CN | 104583332 A | 4/2015 |
| CN | 105949695 A | 9/2016 |
| JP | 2004-051681 A | 2/2004 |
| JP | 2008-169233 A | 7/2008 |
| JP | 2011-517720 A | 6/2011 |
| JP | 2016-216583 A | 12/2016 |

OTHER PUBLICATIONS

International Search Report for PCT/JP2018/002011 (PCT/ISA/210) dated Apr. 24, 2018, with English translation.
English Machine translation of Japanese publication JP2004-051681-A, published Feb. 19, 2004.
English Machine translation of Japanese publication JP2008-169233-A, published Jul. 24, 2008.
Extended European Search Report, dated Oct. 5, 2020, for European Application No. 18745067.1.
Chinese Office Action and Search Report, dated Apr. 23, 2021, for Chinese Application No. 201880008041.1, with English translations.
Japan Packaging Technology Association, "Handbook of Packaging Techniques," China Machine Press, May 31, 1994, pp. 318-319 (total 3 pages).
Japanese Office Action for Japanese Application No. 2018-564588, dated Nov. 24, 2021, with English translation.

* cited by examiner

*Primary Examiner* — Robert D Harlan
(74) *Attorney, Agent, or Firm* — Birch, Stewart, Kolasch & Birch, LLP

(57) ABSTRACT

Provided is a molded article comprising a resin, wherein the resin comprises a methacrylic resin comprising a structural unit derived from a methacrylic acid ester and a structural unit derived from a silica particle having an average primary particle diameter of 1 nm or more and 50 nm or less and comprising at least one polymerizable functional group, and the molded article has an absolute value of degree of orientation in the thickness direction of 0.02 or more and satisfies the requirement (I):

(I) When the free induction decay curve (X) obtained by measuring the molded article by a solid echo method at 150° C. using a pulse nuclear magnetic resonance measurement apparatus is approximated by the least square method using the formula (F1), the sum (B+C) of the component fractions of two components having different spin-spin relaxation times in the free induction decay curve (X) is 4% or more.

9 Claims, No Drawings

MOLDED ARTICLE AND METHOD OF PRODUCING THE SAME

TECHNICAL FIELD

The present invention relates to a molded article comprising a methacrylic resin and a method of producing the same.

BACKGROUND ART

Methacrylic resins are used as materials of the molded article which is excellent in transparency. In recent years, in order to apply to applications requiring transparency and mechanical strengths, development of a transparent molded article excellent in mechanical strengths such as rigidity and the like has been conducted.

For example, Japanese Unexamined Patent Application Publication (JP-A) No. 2004-051681 (Patent Document 1) discloses that silica particles are surface-modified using a resin monomer comprising a hydrogen bonding functional group and an unsaturated double bond group, and then the surface-modified silica particles are blended in a mixed solution comprising methyl methacrylate, a polymerization initiator and a solvent, and the resin monomer of the surface-modified silica particles and methyl methacrylate are polymerized to obtain a highly rigid nanocomposite resin composition.

PRIOR ART DOCUMENT

Patent Document

Patent Document 1: JP-A No. 2004-051681

SUMMARY OF THE INVENTION

Problem to be Solved by the Invention

Although the molded article formed from the nanocomposite resin composition of Patent Document 1 is excellent in rigidity, it was not satisfactory in the point of impact resistance.

An object of the present invention is to provide a molded article excellent in rigidity and impact resistance.

Means for Solving the Problem

The present invention provides a molded article and a method of producing the molded article described below.

[1] A molded article comprising a resin, wherein
the above-described resin comprises a methacrylic resin comprising
a structural unit derived from a methacrylic acid ester and
a structural unit derived from a silica particle having an average primary particle diameter of 1 nm or more and 50 nm or less and comprising at least one polymerizable functional group, and
the above-described molded article has an absolute value of degree of orientation in the thickness direction of 0.02 or more and satisfies the following requirement (I):
(I) When the free induction decay curve (X) obtained by measuring the molded article by a solid echo method at 150° C. using a pulse nuclear magnetic resonance measurement apparatus is approximated by the least square method using the following formula (F1), the sum (B+C) of the component fractions of two components having different spin-spin relaxation times in the free induction decay curve (X) is 4% or more:

$$M(t)=A \times MA(t)+B \times \exp(-t/T2_B)+C \times \exp(-t/T2_C) \quad \text{formula (F1)}$$

in the formula (F1),
B and C represent the respective component fractions of two components having different spin-spin relaxation times in the free induction decay curve (X),
$T2_B$ and $T2_C$ ($T2_B > T2_C$) represent respective spin-spin relaxation times in the two components, and t represents the decay time,
A represents the component fraction of a component corresponding to the free induction decay curve (Y) obtained by separately measuring a molded article comprising a methacrylic polymer not comprising the above-mentioned structural unit derived from a silica particle by a solid echo method at 150° C. using the above-described pulse nuclear magnetic resonance measurement apparatus,
MA (t) represents the macroscopic magnetization of the free induction decay curve (Y), and
the component fractions A, B and C respectively represent percentages of respective components to the sum of A, B and C.

[2] The molded article according to [1], wherein the above-described polymerizable functional group is at least one group selected from the group consisting of a methacryloyl group, an acryloyl group, a styryl group, an α-methylstyryl group and an itaconyl group.

[3] A method of producing the molded article of [1], comprising
a step of polymerizing the methacrylic acid ester and the silica particle to produce the methacrylic resin, and
a step of stretching the methacrylic resin.

[4] The method of producing the molded article according to [3], wherein the amount of the silica particle used is 7 parts by mass or more with respect to 100 parts by mass of the methacrylic acid ester.

[5] An automotive material comprising the molded article according to [1] or [2].

[6] A display window protective plate comprising the molded article according to [1] or [2].

Advantageous Effect of the Invention

According to the present invention, a molded article which is excellent in rigidity and impact resistance can be obtained.

MODES FOR CARRYING OUT THE INVENTION

<Molded article>

The molded article according to the present invention comprises a methacrylic resin comprising a structural unit derived from a methacrylic acid ester and a structural unit derived from a silica particle having an average primary particle diameter of 1 nm or more and 50 nm or less and comprising at least one polymerizable functional group. The molded article according to the present invention has an absolute value of degree of orientation in the thickness direction of 0.02 or more and satisfies the following requirement (I):
(I) When the free induction decay curve (X) obtained by measuring the molded article by a solid echo method at 150° C. using a pulse nuclear magnetic resonance measurement apparatus is approximated by the least square method using the following formula (F1), the sum (B+C) of the component fractions of two components having different spin-spin relaxation times in the free induction decay curve (X) is 4% or more:

$$M(t)=A \times MA(t)+B \times \exp(-t/T2_B)+C \times \exp(-t/T2_C) \quad \text{formula (F1)}$$

in the formula (F1),

B and C represent the respective component fractions of two components having different spin-spin relaxation times in the free induction decay curve (X), $T2_B$ and $T2_C$ ($T2_B > T2_C$) represent respective spin-spin relaxation times in the two components, and t represents the decay time, A represents the component fraction of a component corresponding to the free induction decay curve (Y) obtained by separately measuring a molded article comprising a methacrylic polymer not comprising the above-mentioned structural unit derived from a silica particle by a solid echo method at 150° C. using the above-described pulse nuclear magnetic resonance measurement apparatus, MA (t) represents the macroscopic magnetization of the free induction decay curve (Y), and the component fractions A, B and C respectively represent percentages of respective components to the sum of A, B and C.

(1) Absolute Value of Degree of Orientation in Thickness Direction

The absolute value of the degree of orientation in the thickness direction of the molded article is 0.02 or more, preferably 0.02 or more and 0.5 or less, more preferably 0.02 or more and 0.4 or less, further preferably 0.02 or more and 0.3 or less. Further, the absolute value of the degree of orientation in the thickness direction of the molded article preferably exceeds 0.04. By setting the degree of orientation in the thickness direction of the molded article in the above range, a molded article excellent in impact resistance can be provided.

As the absolute value of the degree of orientation in the thickness direction of the molded article is larger, the molecular chains of the methacrylic resin are arranged in a direction more perpendicular to the thickness direction, so that the impact resistance of the molded article can be improved.

For example, the absolute value of the degree of orientation in the thickness direction of 0.02 or more can be imparted to the molded article by a stretching treatment.

The absolute value of the degree of orientation in the thickness direction of the molded article is determined by the following method.

With respect to the molded article, measurement of retardation by the Senalmon method is performed using a red (wavelength 632.8 nm) laser beam as a light source. From the measured values of retardation obtained, the three main refractive indices Nx, Ny and Nz are calculated according to a method described in Takeshi Kikutani and Koji Ito, "Introduction to high-order structural analysis of plastic molded articles", pp. 72-74, edited by the Japan Society of Polymer Processing, Nikkan Kogyo Shimbun (2006). Nx, Ny, Nz are calculated by rotating the molded article about one principal refractive index axis and measuring retardation from two directions, and the degree of orientation fz in the thickness direction is calculated using the following formula (F4). In the following formula, $\Delta n$ is the intrinsic birefringence of the molded article.

$$fz=[(Nz-Nx)+(Nz-Ny)]/(2\Delta n) \quad \text{formula (F4)}$$

The degree of orientation in the thickness direction of the molded article can be adjusted by changing the stretch ratio, the stretching temperature, the stretching speed, the cooling speed after stretching, and the composition of the methacrylic resin, at the time of stretching the methacrylic resin.

For example, the degree of orientation tends to increase as the stretching speed increases, and the degree of orientation tends to increase as the stretching temperature decreases. In addition, when a molded article is produced by press stretching, the degree of orientation tends to increase as the stretch ratio in the thickness direction increases, and the degree of orientation tends to increase as the cooling speed increases in the cooling step after stretching.

(2) Requirement (I)

The molded article satisfies the above requirement (I). Thereby, a molded article which is excellent in rigidity and impact resistance can be provided.

The value of the sum (B+C) of the component fractions of two components having different spin-spin relaxation times (T2) in the above requirement (I) tends to increase by increasing the amount of the polymerizable functional group to be modified on the surface of a silica particle, increasing the use amount (addition amount) of a silica particle comprising at least one polymerizable functional group in production of a methacrylic resin, or producing a molded article through a step of stretching a methacrylic resin.

In particular, by producing a molded article by a method including a step of stretching a methacrylic resin, the sum of the component fractions of two components different in T2 described above can be increased at the smaller amount of use of the above-mentioned silica particle as compared with the case of producing a molded article by a method not comprising a stretching step.

The sum (B+C) of the component fractions of two components different in T2 described above is 4% or more, and from the viewpoint of more excellent rigidity, 5% or more is preferable, 10% or more is more preferable, and from the viewpoint of more excellent impact resistance, 70% or less is preferable. The larger the sum (B+C) of the component fractions of two components different in T2 described above, the higher the rigidity of the molded article can be.

Here, the sum (A+B+C) of the component fraction of a component corresponding to the free induction decay curve (Y) of a molded article made of a methacrylic polymer not comprising the structural unit derived from a silica particle and the component fractions of two components different in T2 described above is taken as 100%.

"The molded article made of a methacrylic polymer not comprising a structural unit derived from a silica particle described above" denotes a molded article made of a methacrylic polymer (methacrylic resin) produced by the same method as for the molded article for which the sum (B+C) of the component fractions is measured except that only the above-mentioned methacrylic acid ester is used without using the above-mentioned silica particle.

The sum (B+C) of the component fractions of the two components different in T2 can be obtained from the free induction decay curve obtained by measuring a molded article by a solid echo method using a pulse nuclear magnetic resonance (pulse NMR) apparatus. Specifically, it can be determined by the following method.

A sample is produced from the molded article of the present invention. The sample is measured by a solid echo method under the conditions of repetition time: 1 sec, integration number: 100 times and measurement temperature: 150° C. using a pulse NMR measuring device (Minispec mq 20 manufactured by BRUKER) with an observation nucleus of 1H, to obtain the free induction decay curve (X).

Separately, a sample is prepared from a molded article comprising a methacrylic polymer not comprising the structural unit derived from a silica particle, and measurement is performed under the same conditions as described above to obtain the free induction decay curve (Y).

Approximation is performed by the least square method, assuming that the sample produced from the molded article of the present invention comprises a total of three components: a component corresponding to the free induction decay curve (Y) and two components having different spin-spin relaxation times (T2) in the free induction decay curves (X) and the free induction decay curve (X) includes overlap of lines corresponding to the three components. More specifically, the free induction decay curve (X) is approximated by the least square method using the following equation (F1), and the sum (B+C) of the component fractions of two components different in T2 is determined.

$$M(t)=A \times MA(t)+B \times \exp(-t/T2_B)+C \times \exp(-t/T2_C) \quad \text{formula (F1)}$$

[In the formula (F1),

B and C represent the respective component fractions of two components having different spin-spin relaxation times in the free induction decay curve (X), $T2_B$ and $T2_C(T2_B>T2_C)$ represent respective spin-spin relaxation times in the two components, and t represents the decay time.

A represents the component fraction of a component corresponding to the free induction decay curve (Y), and MA (t) represents the macroscopic magnetization of the free induction decay curve (Y).

The component fractions A, B and C respectively represent percentages of respective components to the sum of A, B and C.]

(3) Methacrylic resin

The methacrylic resin is a resin comprising a structural unit derived from a methacrylic acid ester and a structural unit derived from a silica particle having an average primary particle diameter of 1 nm or more and 50 nm or less and comprising at least one polymerizable functional group.

The methacrylic resin may further comprise a structural unit derived from another monomer copolymerizable with the methacrylic acid ester.

The methacrylic acid ester includes methyl methacrylate, ethyl methacrylate, propyl methacrylate, butyl methacrylate, 2-ethylhexyl methacrylate, lauryl methacrylate, tetrahydrofurfuryl methacrylate, isobornyl methacrylate, benzyl methacrylate, cyclohexyl methacrylate, hydroxyethyl methacrylate, hydroxypropyl methacrylate, hydroxybutyl methacrylate and the like. The methacrylic acid ester is preferably methyl methacrylate or includes methyl methacrylate. The methacrylic acid ester may be used alone or in combination of two or more. For example, methyl methacrylate and methacrylic acid esters other than methyl methacrylate may be used in combination.

The other monomer copolymerizable with the methacrylic acid ester may be a monofunctional monomer comprising one radically polymerizable double bond in one molecule, or may be a polyfunctional monomer comprising two or more radically polymerizable double bonds in one molecule. The other monomer copolymerizable with the methacrylic acid ester may be used alone or in combination of two or more.

Examples of the monofunctional monomer include acrylic acid esters such as methyl acrylate, ethyl acrylate, propyl acrylate, butyl acrylate, 2-ethylhexyl acrylate, lauryl acrylate, tetrahydrofurfuryl acrylate, isobornyl acrylate, benzyl acrylate, cyclohexyl acrylate, hydroxyethyl acrylate, hydroxypropyl acrylate, hydroxybutyl acrylate and the like; unsaturated carboxylic acids such as acrylic acid, methacrylic acid and the like; styrene-based monomers such as styrene, α-methylstyrene and the like; unsaturated nitriles such as acrylonitrile, methacrylonitrile and the like; unsaturated carboxylic acid anhydrides such as maleic acid and the like; maleimides such as phenyl maleimide, cyclohexyl maleimide and the like; and carboxylic acid vinyl compounds such as vinyl acetate and the like.

Examples of the polyfunctional unsaturated monomer include allyl acrylate, ethylene glycol diacrylate, diethylene glycol diacrylate, triethylene glycol diacrylate, polyethylene glycol diacrylate, polypropylene glycol diacrylate, 1,3-butylene glycol diacrylate, 1,6-hexanediol diacrylate, neopentyl glycol diacrylate, trimethylol propane triacrylate, tetramethylol methane triacrylate, tetramethylol methane tetraacrylate, allyl methacrylate, ethylene glycol dimethacrylate, diethylene glycol dimethacrylate, triethylene glycol dimethacrylate, polyethylene glycol dimethacrylate, polypropylene glycol dimethacrylate, 1,3-butylene glycol dimethacrylate, 1,6-hexanediol dimethacrylate, neopentyl glycol dimethacrylate, trimethylolpropane trimethacrylate, tetramethylolmethane trimethacrylate, tetramethylolmethane tetramethacrylate, divinylbenzene, diallyl phthalate and the like.

When the methacrylic resin further comprises a structural unit derived from another monomer copolymerizable with the methacrylic acid ester, the content of the structural unit derived from the methacrylic acid ester is preferably 50% by mass or more, more preferably 70% by mass or more, further preferably 90% by mass or more.

The content of the structural unit derived from another monomer copolymerizable with the methacrylic acid ester is preferably 50% by mass or less, more preferably 30% by mass or less, further preferably 10% by mass or less. In the present specification, the sum of the content of the structural unit derived from the methacrylic acid ester and content of the structural unit derived from another monomer copolymerizable with the methacrylic acid ester is taken as 100% by mass.

The content of the structural unit derived from the methacrylic acid ester and the content of the structural unit derived from another monomer copolymerizable with the methacrylic acid ester can be determined, for example, by analysis using 1H NMR measurement or the like.

The average primary particle diameter of the silica particle is 1 nm or more and 50 nm or less from the viewpoint of coexistence of rigidity and impact resistance in the obtained molded article. If the average primary particle size is less than 1 nm or more than 50 nm, it may be difficult to achieve both rigidity and impact resistance in the molded article. If the average primary particle diameter of the silica particle is less than 1 nm or more than 50 nm, the stretchability of the methacrylic resin may be reduced. The average primary particle diameter of the silica particle being 1 nm or more and 50 nm or less is advantageous also from the viewpoint of the transparency of the molded article.

The average primary particle diameter of the silica particle is preferably 5 nm or more and 50 nm or less, more preferably 10 nm or more and 50 nm or less from the viewpoint of achieving both rigidity and impact resistance in a molded article to be obtained and further the transparency of the molded article. The average primary particle size of the silica particle may be 25 nm or less, or 20 μm or less.

The average primary particle size of the silica particle can be measured by a laser analysis type particle size distribution measuring apparatus.

The silica particle comprising at least one polymerizable functional group preferably comprises at least one polymerizable functional group on the surface of the particle. The polymerizable functional group may be chemically bonded to the surface of the silica particle, and for example, at least one hydrogen atom of the hydroxyl group present on the surface of the silica particle may be substituted by the polymerizable functional group. The polymerizable functional group denotes a functional group which can carry out a radical polymerization reaction with the methacrylic acid ester.

Examples of the polymerizable functional group include a vinyl group, an acryloyl group, a styryl group, an allyl group, a methacryloyl group, an α-methylstyryl group, an itaconyl group, an alkenyl group, a crotonyl group and the like. The silica particle may comprise only one polymerizable functional group, or may comprise two or more polymerizable functional groups.

The polymerizable functional group is preferably at least one group selected from the group consisting of a methacryloyl group, an acryloyl group, a styryl group, an α-methylstyryl group and an itaconyl group, and more preferably a methacryloyl group.

As a method of producing a silica particle comprising at least one polymerizable functional group, for example, a method of modifying the surface of a silica particle with a surface treatment agent comprising a polymerizable functional group such as a silane coupling agent comprising a polymerizable functional group or the like is mentioned.

Examples of the silane coupling agent comprising a polymerizable functional group include methacryltrimethoxysilane, methacryltriethoxysilane, methacryltripropoxysilane, acryltrimethoxysilane, acryltriethoxysilane, acryltripropoxysilane, vinyltrimethoxysilane, vinyltriethoxysilane, vinyltripropoxysilane, styryltrimethoxysilane, styryltriethoxysilane, styryltripropoxysilane and the like. Among these, methacryltrimethoxysilane, methacryltriethoxysilane or methacryltripropoxysilane is more preferable.

The silica particle comprising at least one polymerizable functional group may comprise a functional group other than the polymerizable functional group. As a method of producing a silica particle comprising a functional group other than the polymerizable functional group, for example, a method of modifying the surface of a silica particle with a surface treatment agent comprising the functional group such as a silylating agent comprising the functional group or a silane coupling agent comprising the functional group is mentioned. When using a surface treatment agent, a reaction catalyst can be used as needed.

Examples of the surface treatment agent comprising a functional group other than the above polymerizable functional group include trimethylsilyl chloride, triethylsilyl chloride, hexamethyldisilazane, tert-butyldimethylsilyl chloride, tri-iso-propylsilyl chloride, and 1,3-dichloro-1,1,3,3-tetra-tri-iso-propyldisiloxane, chloromethyltrimethylsilane, triethylsilane, tert-butyldimethylsilane, hexamethylmethyltrimethoxysilane, methyltriethoxysilane, hexyltrimethoxysilane, decyltrimethoxysilane, phenyltriethoxysilane, 3-glycidoxypropyltrimethoxysilane, 3-glycidoxypropyltriethoxysilane, trimethylmethoxysilane, trimethylethoxysilane trimethylpropoxysilane, hexamethyldisiloxane and the like.

The content of the structural unit derived from the silica particle comprising at least one polymerizable functional group in the methacrylic resin is preferably 5 parts by mass or more, more preferably 7 parts by mass, further preferably 10 parts by mass or more in that a molded article excellent in rigidity is obtained, and preferably 200 parts by mass or less, more preferably 100 parts by mass or less, further preferably 50 parts by mass or less in that a molded article without cracks is obtained, with respect to 100 parts by mass of the structural unit derived from the methacrylic acid ester. As the content of the structural unit derived from the silica particle is larger, the sum (B+C) of the component fractions of the two components different from each other in T2 becomes larger, and the rigidity of the molded article can be enhanced.

The amount of the silica particle residue of the methacrylic resin measured by thermogravimetric analysis at 500° C. is preferably 6% by mass or more in that a molded article having excellent rigidity is obtained, and is preferably 67% by mass or less in that a molded article having no cracks is obtained. The amount of the silica particle residue in the methacrylic resin is more preferably 10% by mass or more and less than 50% by mass.

The amount of the silica particle residue of the methacrylic resin can be adjusted by the addition amount of the silica particle comprising at least one polymerizable functional group used at the time of production of the methacrylic resin.

The amount of the silica particle residue of the methacrylic resin measured by thermogravimetric analysis at 500° C. can be obtained by raising the temperature of the methacrylic resin from room temperature to 500° C. at a heating rate of 20° C./min using a commercially available thermogravimetric analyzer, determining the mass of the residue at the time of reaching 500° C. and calculating by the following equation.

Amount of a silica particle residue of methacrylic resin (% by mass)=Mass of residue/mass of methacrylic resin before analysis×100

The methacrylic resin is usually an amorphous resin. The glass transition temperature Tg of the methacrylic resin is, for example, 90° C. or more and 150° C. or less, and, from the viewpoint of the impact resistance of the molded article, preferably 100° C. or more and 130° C. or less.

The glass transition temperature Tg of the resin P is a midpoint glass transition temperature determined by DSC (differential scanning calorimetry) based on JIS K 7121.

(4) Method of Producing Methacrylic Resin

The method of producing a methacrylic resin according to the present invention includes a method comprising a step of polymerizing a mixture comprising a methacrylic acid ester (or a monomer mixture comprising a methacrylic acid ester and another monomer copolymerizable with the methacrylic acid ester) and a silica particle having an average primary particle size of 1 nm or more and 50 nm or less and comprising at least one polymerizable functional group by a polymerization method such as an emulsion polymerization method, a suspension polymerization method, a bulk polymerization method, a liquid injection polymerization method (cast polymerization method) and the like; and other methods.

The polymerization is carried out using light irradiation or a polymerization initiator. The polymerization initiator is used in an amount of generally 0.01 part by mass or more and 1 part by mass or less, preferably 0.01 part by mass or more and 0.5 parts by mass or less, with respect to 100 parts by mass of the sum of the methacrylic acid ester (or the above monomer mixture) and the silica particle. A chain transfer agent (linear or branched alkyl mercaptan compound such as methyl mercaptan, n-butyl mercaptan, t-butyl mercaptan), a crosslinking agent and the like may be further added.

The polymerization initiator includes azo compounds such as 1,1'-azobis(cyclohexane-1-carbonitrile), 2,2'-azobis (2,4,4-trimethylpentene), 2,2'-azobis(2-methylpropane) 2-cyano-2-propylazoformamide, 2,2'-azobis(2-hydroxymethyl propionate), 2,2'-azobis(2-methyl-butyronitrile), 2,2'-azobisisobutyronitrile, 2,2'-azobis(2,4-dimethyl-valeronitrile), 2,2'-azobis(2,4-dimethyl-4-methoxyvaleronitrile), 2,2'-azobis[2-(2-imidazolin-2-yl)propane] and dimethyl 2,2'-azobis(2-methyl propionate); diacyl peroxide-based or dialkyl peroxide-based initiators such as dicumyl peroxide, tert-butylcumyl peroxide, di-tert-butyl peroxide, benzoyl peroxide and lauroyl peroxide; peroxy ester-based initiators such as tert-butylperoxy-3,3,5-trimethyl hexanoate, tert-butyl peroxy laurate, tert-butylperoxy isobutyrate, tert-butylperoxy acetate, di-tert-butylperoxy hexahydroterephthalate, di-tert-butylperoxy azelate, tert-butylperoxy-2-ethylhexanoate, 1,1,3,3-tetramethylbutylperoxy-2-ethylhexanoate, tert-amylperoxy-2-ethylhexanoate and tert-butylperoxy pivalate; percarbonate-based initiators such as tert-butylperoxy allyl carbonate, tert-butylperoxy isopropyl carbonate and bis(4-t-butylcyclohexyl)peroxy dicarbonate; and peroxyketal-based initiators such as 1,1-di-tert-butylperoxycyclohexane, 1,1-di-tert-butylperoxy-3,3,5-trimethylcyclohexane and 1,1-di-tert-butylperoxy-3,3,5 trimethylcyclohexane. The radical initiator may be used alone or in combination of two or more.

As the chain transfer agent, any one used in general radical polymerization may be used, and examples thereof include mercaptan compounds such as butyl mercaptan, n-octyl mercaptan, dodecyl mercaptan, 2-ethylhexyl thioglycolate and the like. The chain transfer agent may be used alone or in combination of two or more.

In producing a methacrylic resin, the use amount the silica particle comprising at least one polymerizable functional group is preferably 5 parts by mass or more, more preferably 7 parts by mass or more, further preferably 10 parts by mass or more in that a molded article excellent in rigidity is obtained, and preferably 200 parts by mass or less, more preferably 100 parts by mass or less, further preferably 50 parts by mass or less in that a molded article without cracks is obtained. As the addition amount of the silica particle is larger, the sum (B+C) of the component fractions of the two components different in T2 becomes larger, and the rigidity of the molded article can be enhanced.

(5) Molded Article

The molded article according to the present invention comprises a resin, and the resin comprises the above-mentioned methacrylic resin. Thereby, the molded article according to the present invention can be excellent in rigidity and impact resistance.

The molded article preferably comprises 50% by mass or more, more preferably 70% by mass or more, further preferably 90% by mass or more of the above-described methacrylic resin from the viewpoint of rigidity and impact resistance. Most preferably, the molded article is made of the above-mentioned methacrylic resin (content of the above-mentioned methacrylic resin: 100% by mass). The content of the methacrylic resin in the molded article may be less than 100% by mass, 95% by mass or less, or 90% by mass or less.

The molded article according to the present invention may comprise components other than the above-described methacrylic resin as needed. The molded article according to the present invention may comprise additives such as, for example, a mold release agent, a heat stabilizer, an antioxidant, an ultraviolet absorber, a colorant such as a dye or a pigment, an inorganic filler other than a silica particle, a polymerization inhibitor, a flame retardant, a reinforcing agent and the like.

The mold release agent is not particularly limited, and examples thereof include higher fatty acid esters, higher aliphatic alcohols, higher fatty acids, higher fatty acid amides, higher fatty acid metal salts and the like. The mold release agent may be used alone or in combination of two or more.

The higher fatty acid ester includes, for example, saturated fatty acid alkyl esters such as methyl laurate, ethyl laurate, propyl laurate, butyl laurate, octyl laurate, methyl palmitate, ethyl palmitate, propyl palmitate, butyl palmitate, octyl palmitate, methyl stearate, ethyl stearate, propyl stearate, butyl stearate, octyl stearate, stearyl stearate, myristyl myristate, methyl behenate, ethyl behenate, propyl behenate, butyl behenate, octyl behenate and the like; unsaturated fatty acid alkyl esters such as methyl oleate, ethyl oleate, propyl oleate, butyl oleate, octyl oleate, methyl linoleate, ethyl linoleate, propyl linoleate, butyl linoleate, octyl linoleate and the like; saturated fatty acid glycerides such as lauric acid monoglyceride, lauric acid diglyceride, lauric acid triglyceride, palmitic acid monoglyceride, palmitic acid diglyceride, palmitic acid triglyceride, stearic acid monoglyceride, stearic acid diglyceride, stearic acid triglyceride, behenic acid monoglyceride, behenic acid diglyceride, behenic acid triglyceride and the like; and unsaturated fatty acid glycerides such as oleic acid monoglyceride, oleic acid diglyceride, oleic acid triglyceride, linoleic acid monoglyceride, linoleic acid diglyceride, linoleic acid triglyceride and the like. Among these, methyl stearate, ethyl stearate, butyl stearate, octyl stearate, stearic acid monoglyceride, stearic acid diglyceride, stearic acid triglyceride and the like are preferable.

Examples of the higher aliphatic alcohol include saturated aliphatic alcohols such as lauryl alcohol, palmityl alcohol, stearyl alcohol, isostearyl alcohol, behenyl alcohol, myristyl alcohol, cetyl alcohol and the like; and unsaturated aliphatic alcohols such as oleyl alcohol, linoleyl alcohol and the like. Among these, stearyl alcohol is preferred.

Examples of the higher fatty acid include saturated fatty acids such as caproic acid, caprylic acid, capric acid, lauric acid, myristic acid, palmitic acid, stearic acid, arachidic acid, behenic acid, lignoceric acid, 12-hydroxyoctadecanoic acid and the like; and unsaturated fatty acids such palmitoleic acid, oleic acid, linoleic acid, linolenic acid, cetoleic acid, erucic acid, ricinoleic acid and the like.

Examples of the higher fatty acid amide include saturated fatty acid amides such as lauric acid amide, palmitic acid amide, stearic acid amide, behenic acid amide; unsaturated fatty acid amides such as oleic acid amide, linoleic acid amide, erucic acid amide and the like; and amides such as ethylenebislauric acid amide, ethylenebispalmitic acid amide, ethylenebisstearic acid amide, N-oleylstearoamide and the like. Among these, stearic acid amide and ethylenebisstearic acid amide are preferable.

Examples of higher fatty acid metal salt include sodium salts, potassium salts, calcium salts and barium salts of the above-mentioned higher fatty acids.

The content of the mold release agent is preferably 0.01 part by mass or more and 1.0 parts by mass or less, more preferably 0.01 part by mass or more and 0.5 parts by mass or less with respect to 100 parts by mass of a methacrylic resin.

The heat stabilizer is not particularly limited, and examples thereof include hindered phenol-based heat stabilizers, phosphorus-based heat stabilizers and organic disulfide compounds and the like. Among these, organic disulfide compounds are preferable. The heat stabilizer may be used alone or in combination of two or more.

Examples of the hindered phenol-based heat stabilizer include 1,3,5-tris(3,5-di-tert-butyl-4-hydroxybenzyl)-1,3,5-triazin e-2,4,6[1H,3H,5H]-trione, octadecyl 3-(3,5-di-tert-butyl-4-hydroxyphenyl)propionate, pentaerythritol tetrakis [3-(3,5-di-tert-butyl-4-hydroxyphenyl)propionate], 3,9-bis{2-[3-(3-tert-butyl-4-hydroxy-5-methylphenyl)propionyloxy]-1,1-dimethylethyl}-2,4,8,10-tetraoxaspiro[5.5]undeca ne, 1,3,5-tris(3,5-di-tert-butyl-4-hydroxyphenylmethyl)-2,4,6-t rimethylbenzene and the like. Among these, octadecyl 3-(3,5-di-tert-butyl-4-hydroxyphenyl)propionate or pentaerythritol tetrakis[3-(3,5-di-tert-butyl-4-hydroxyphenyl)propionate] is preferable.

Examples of the phosphorus-based heat stabilizer include tris(2,4-di-t-butylphenyl)phosphite, 2-[[2,4,8,10-tetrakis(1,1-dimethylethyl)dibenzo[d,f][1,3,2] dioxaphosphepin-6-yl]oxy]-N,N-bis[2-[[2,4,8,10-tetrakis(1,1-dimethylethyl) dibenzo[d,f][1,3,2]dioxaphosphepin-6-yl]oxy]-ethyl] ethanamine, diphenyltridecyl phosphite, triphenyl phosphite, 2,2-methylenebis(4,6-di-tert-butylphenyl)octyl phosphite, bis(2,6-di-tert-butyl-4-methylphenyl)pentaerythritol diphosphite and the like. Among these, 2,2-methylenebis(4,6-di-tert-butylphenyl)octylphosphite is preferable.

Examples of the organic disulfide compound include dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide and the like. Among these, di-tert-alkyl disulfide is preferable, and di-tert-dodecyl disulfide is more preferable.

It is preferable that the content of the heat stabilizer is 1 ppm by mass or more and 2000 ppm by mass or less with respect to 100 parts by mass of a methacrylic resin.

Examples of the ultraviolet absorber include benzophenone-based ultraviolet absorbers, cyanoacrylate-based ultraviolet absorbers, benzotriazole-based ultraviolet absorbers, malonic acid ester-based ultraviolet absorbers, oxalanilide-based ultraviolet absorbers and the like. The ultraviolet absorber may be used alone or in combination of two or more. Among these, benzotriazole-based ultraviolet absorbers, malonic acid ester-based ultraviolet absorbers, or oxalanilide-based ultraviolet absorbers are preferable.

Examples of the benzophenone-based ultraviolet absorber include 2,4-dihydroxybenzophenone, 2-hydroxy-4-methoxybenzophenone, 2-hydroxy-4-methoxybenzophenone-5-sulfonic acid, 2-hydroxy-4-octyloxybenzophenone, 4-dodecyloxy-2-hydroxybenzophenone, 4-benzyloxy-2-hydroxybenzophenone, 2,2'-dihydroxy-4,4'-dimethoxy benzophenone and the like.

Examples of the cyanoacrylate-based ultraviolet absorber include ethyl 2-cyano-3,3-diphenylacrylate, 2-ethylhexyl 2-cyano-3,3-diphenylacrylate and the like.

Examples of the benzotriazole-based ultraviolet absorber include 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotri azole, 2-(3,5-di-t-pentyl-2-hydroxyphenyl)-2H-benzotriazole, 2-(3,5-di-t-butyl-2-hydroxyphenyl)-2H-benzotriazole, 2-(2H-benzotriazol-2-yl)-4-methyl-6-(3,4,5, 6-tetrahydrophthalimidylmethyl)phenol, 2-(2-hydroxy-5-t-octylphenyl)-2H-benzotriazole and the like.

As the malonic acid ester-based ultraviolet absorber, 2-(1-arylalkylidene) malonic acid esters are generally used, and examples thereof include dimethyl 2-(paramethoxybenzylidene)malonate and the like.

As the oxalanilide-based ultraviolet absorber, 2-alkoxy-2'-alkyloxalanilides are usually used, and for example, 2-ethoxy-2'-ethyloxalanilide and the like are mentioned.

It is preferable that the content of the ultraviolet absorber is 5 ppm by mass or more and 1000 ppm by mass or less with respect to 100 parts by mass of a methacrylic resin.

The shape of the molded article according to the present invention is not particularly limited, and examples thereof include a plate, a sheet, a film, a shape of the product itself, a shape of the part itself used for the product, and the like The molded article according to the present invention may be processed to obtain a desired product or part (member).

In some embodiments, the molded article is a plate, a sheet or a film. The width and length of the plate, sheet or film are not particularly limited. The plate, sheet or film is, for example, a long product or a roll thereof. The thickness of the plate, sheet or film is, for example, 10 μm or more and 50 mm or less, and may be 0.1 mm or more and 10 mm or less or 0.5 mm or more and 4 mm or less.

The molded article according to the present invention may be a plate fragment, sheet fragment or film fragment cut from the plate, sheet or film.

Various resin products or resin parts can be produced using the molded article according to the present invention. Examples of the resin products or resin parts include automotive materials, display window protective plates and the like.

The display window protective plate is used in an electronic device comprising a window (display) for displaying character information, image information and the like, and protects the above-described window (display). Examples of the electronic device include a mobile phone, a smartphone, a personal computer, a tablet, a digital camera, a video camera, a portable game, a portable audio player, and the like.

Examples of the automotive material include rear lamp covers, headlamp covers, windows for automobiles such as front glasses, side glasses, rear glasses and roofs, and the like.

Resin products or resin parts such as automotive materials and display window protective plates can be produced by cutting the plate, sheet or film, which is the molded article according to the present invention, into a desired shape and size, alternatively by further processing (for example, shape adjustment and the like).

<Method of Producing Molded Article>

The method of producing a molded article according to the present invention comprises a step of polymerizing the above-mentioned methacrylic acid ester and the above-mentioned silica particle to produce the above-mentioned methacrylic resin, and a step of stretching the obtained methacrylic resin. The step for producing the methacrylic resin is as described above.

The method of producing a molded article according to the present invention is suitable as a method of producing the molded article according to the present invention.

The step of stretching includes, for example, a heating step of heating a methacrylic resin at a temperature not lower than (Tg−60° C.) lower than the glass transition temperature Tg of the methacrylic resin by 60° C., a stretching step of stretching within the above-described temperature range, and a cooling step of cooling the molded article obtained by stretching down to lower than (Tg−60° C.)

The method of producing the molded article can further comprise a process of molding a methacrylic resin to produce an unstretched molded article, before the heating process. In this case, the unstretched molded article is subjected to the heating step, the stretching step, and the cooling step.

As the molding method for producing an unstretched molded article, for example, an extrusion molding method, an injection molding method, a hot plate press molding method and the like are mentioned.

The shape of the unstretched molded article is not particularly limited, but is preferably plate-like, sheet-like or film-like.

The method of producing the molded article can further comprise a step of mixing or kneading other blending components such as a resin other than a methacrylic resin, additives described above and the like, and the methacrylic resin before the heating step, or while conducting the heating step, or before the step of producing an unstretched molded article.

When the molded article comprises a methacrylic resin and a resin other than the methacrylic resin, the glass transition temperature of the methacrylic resin can be read as the glass transition temperature of a mixed or kneaded material of a methacrylic resin and a resin other than the methacrylic resin.

By performing the stretching step, it is possible to increase the absolute value of the degree of orientation in the thickness direction of a molded article, and the sum (B+C) of the component fractions of the two components different in T2.

The temperature in the stretching step and the heating step described above is preferably (Tg−60° C.) or more and (Tg+60° C.) or less of a methacrylic resin, more preferably (Tg−40° C.) or more and (Tg+40° C.) or less of a methacrylic resin, further preferably (Tg−30° C.) or more and (Tg+30° C.) or less of a methacrylic resin, particularly preferably (Tg−20° C.) or more and (Tg+20° C.) or less of a methacrylic resin. If the temperature at the time of the stretching step (stretching temperature) is too low, there is a possibility that a crack may occur in the obtained molded article, and if the temperature is too high, there is a possibility that the absolute value of the degree of orientation in the thickness direction of the molded article does not increase and a molded article excellent in impact resistance is not obtained.

The stretching temperature means the mold temperature (die temperature) in the stretching step or the temperature in the stretching tank.

Examples of the stretching method in the stretching step include uniaxial stretching methods such as free-width uniaxial stretching, constant-width uniaxial stretching and the like, biaxial stretching methods such as sequential biaxial stretching, simultaneous biaxial stretching and the like, and a press stretching method of stretching while applying pressure, and the like. Among them, a biaxial stretching method or a press stretching method is preferable, and a press stretching method is more preferable because the methacrylic resin can be stretched uniformly.

The stretching speed in the stretching step is not particularly limited, and in the case of the press stretching method, for example, a speed at which the thickness of a methacrylic resin changes at a rate of 0.01 mm/sec or more and 100 mm/sec or less is preferable. The stretching speed may be varied or constant. If the stretching speed is too slow, the orientation may be relaxed during stretching, and the absolute value of the degree of orientation in the thickness direction may not be 0.02 or more, and it may be difficult to obtain a molded article having excellent impact resistance, while if the stretching speed is too fast, a molded article may be cracked.

The stretching ratio in the thickness direction (thickness before stretching/thickness after stretching) is preferably 1.1 times or more and 10.0 times or less, more preferably 1.2 times or more and 7 times or less, further preferably 1.5 times or more and 5.0 times or less, particularly preferably 1.8 times or more and 4.0 times or less.

As the stretch ratio in the thickness direction increases, the absolute value of the degree of orientation in the thickness direction increases, and a molded article having excellent impact resistance tends to be obtained.

If the stretch ratio in the thickness direction is too large, the appearance of the resulting molded article may be degraded.

The thickness direction is a direction indicating the thickness of an object to be stretched, and is usually a direction perpendicular to the widest surface of the object. For example, in the press stretching method, the direction in which pressure is applied is the thickness direction, and in the uniaxial stretching method or the biaxial stretching method, the direction perpendicular to the tensile direction is the thickness direction.

When the temperature in the stretching step and the heating step is (Tg−60° C.) or more and less than (Tg−20° C.) of a methacrylic resin, the stretching ratio is preferably 1.1 times or more and 2.0 times or less, when the temperature in the stretching step and the heating step is (Tg−20° C.) or more and (Tg+30° C.) or less of a methacrylic resin, the stretching ratio is preferably 1.5 times or more and 5.0 times or less, and when the temperature in the stretching step and the heating step is higher than (Tg+30° C.) and not higher than (Tg+60° C.) of a methacrylic resin, the stretch ratio is preferably 3.0 times or more and 10.0 times or less.

A more preferable relationship between the temperature and the stretch ratio in the stretching step and the heating step is that the stretch ratio is 1.5 times or more and 5.0 times or less when the temperature in the stretching step and the heating step is (Tg−20° C.) or more and (Tg+30° C.) or less of a methacrylic resin, and more preferably the stretching ratio is 2.0 times or more and 4.0 times or less.

The pressure at the time of stretching in the stretching step is not particularly limited, and varies depending on the apparatus used or the area of a methacrylic resin to be stretched (or unstretched molded article), and in the case of press stretching, for example, the pressure applied to a 80 mm×80 mm square methacrylic resin (or unstretched molded article) is preferably 0.1 MPa or more and 1000 MPa or less. When the pressure at the time of stretching is too small, there is a possibility that the film cannot be stretched to a desired thickness.

As the cooling step, a method of cooling in a compression press or on a cooling press or the like is mentioned.

The cooling speed in the cooling step is not particularly limited, but is preferably cooled to less than (Tg−60° C.). As the cooling speed is higher, the orientation due to stretching tends to remain in a molded article, the absolute value of the degree of orientation in the thickness direction tends to be 0.02 or more, and a molded article having excellent impact resistance is easily obtained. The temperature of a molded article after cooling is not particularly limited as long as the molded article does not shrink, but the lower the temperature, the easier the orientation due to stretching remains in a molded article, and the absolute value of the degree of orientation in the thickness direction tends to be 0.02 or more, and a molded article which is excellent in impact resistance is obtained easily.

The cooling method is not particularly limited, but it is preferable to cool while maintaining the load (pressure, tension, etc.) at the time of stretching from the viewpoint of obtaining a molded article having a good appearance and a predetermined thickness with good accuracy.

EXAMPLES

Hereinafter, the present invention will be more specifically described by way of examples, however, the present invention is not limited by these examples, and may be appropriately modified and implemented within the scope which is compatible with the spirit of the present invention, and they are all included in the technical scope of the present invention.

The measurement and evaluation methods adopted in the present specification are as follows.

1. Degree of Orientation in the Thickness Direction

The retardation of the obtained molded article was measured by the Senalmon method. A red (wavelength 632.8 nm) laser beam was used as a light source. From the measured values of retardation, three principal refractive indices Nx, Ny and Nz were calculated according to a method described in Takeshi Kikutani and Hiroshi Ito, "Introduction to higher-order structural analysis of plastic molded articles", pp. 72-74, edited by the Japan Society of Polymer Processing, Nikkan Kogyo Shimbun, Ltd. (2006). Nx, Ny, and Nz were calculated by rotating the molded article about one principal refractive index axis and measuring retardation from two directions, and the degree of orientation fz in the thickness direction was calculated using the following formula (F4). In following formula (F4), Δn is the intrinsic birefringence of the molded article.

$$fz=[(Nz-Nx)+(Nz-Ny)]/(2\Delta n) \quad \text{formula (F4)}$$

2. Sum of Component Fractions of Two Components different in T2

For the obtained molded article, measurement of pulse NMR was performed by a solid echo method. A sample of the molded article was packed in a glass tube of 1 cm in diameter to a height of 1 to 2 cm, and measurement was performed under conditions of repetition time: 1s, number of integrations: 100 times and measurement temperature: 150° C. by a solid echo method using a pulse NMR measuring apparatus (Minispec mq 20 manufactured by BRUKER) of observation nucleus 1H. The measurement was started 10 minutes after the sample was introduced. As a result of the measurement, a free induction decay curve (X) was obtained. Separately, a sample was prepared from a molded article made of a methacrylic polymer obtained by polymerizing methyl methacrylate, and measurement was performed under the same conditions as described above, to obtain a free induction decay curve (Y). The obtained free induction curve (X) was approximated by the least square method using the following formula (F1), to obtain the sum (B+C) of the component fractions of two components different in T2.

$$M(t)=A\times MA(t)+B\times \exp(-t/T2_B)+C\times \exp(-t/T2_C) \quad \text{formula (F1)}$$

[In the formula (F1),

B and C represent the respective component fractions of two components having different spin-spin relaxation times in the free induction decay curve (X), $T2_B$ and $T2_C$ ($T2_B>T2_C$) represent respective spin-spin relaxation times in the two components, and t represents the decay time.

A represents the component fraction of a component corresponding to the free induction decay curve (Y), and MA (t) represents the macroscopic magnetization of the free induction decay curve (Y).

The component fractions A, B and C respectively represent percentages of respective components to the sum of A, B and C.]

3. Flexural Modulus

A test piece was produced by processing the obtained molded article into a strip of 10 mm×80 mm and a thickness of 3 mm. The flexural modulus of the obtained test piece was measured in accordance with JIS K7171. The higher the value, the better the rigidity. A material having a flexural modulus of 3400 MPa or more, preferably 3500 MPa or more, more preferably 3800 MPa or more is suitable as a display window protective plate or a material for automobiles.

4. Impact Resistance

A test piece was produced by processing the obtained molded article into a strip of 10 mm×80 mm and a thickness of 3 mm. The obtained test piece was evaluated by Charpy impact strength when flatwise impact was applied in accordance with JIS K 7111. The higher the Charpy impact strength, the better the impact resistance. One having impact resistance exceeding 16 kJ/m² is suitable as a display window protective plate or a material for automobiles.

5. Amount of a Silica Particle Residue of Methacrylic Resin Measured by Thermogravimetric Analysis at 500° C.

The temperature of a methacrylic resin was raised from room temperature to 500° C. at a heating rate of 20° C./min using a thermogravimetric analyzer (TG/DTA 7200 manufactured by Seiko Instruments Inc.), and the mass of the residue when reaching 500° C. was determined, and the amount of a silica particle residue was calculated by the following formula.

Amount of a silica particle residue of methacrylic resin (% by mass)=Mass of residue/mass of methacrylic resin before analysis×100

6. Glass Transition Temperature (Tg) of Methacrylic Resin

The glass transition temperature of a methacrylic resin was measured as a midpoint glass transition temperature using a differential scanning calorimeter (DSC 7020 manufactured by Seiko Instruments Inc.) based on JIS K 7121 and was adopted as the glass transition temperature.

Example 1

(1) Production of Methacrylic Resin

Ten (10) parts by mass of silica particles having an average primary particle diameter of 10 nm and comprising a methacryloyl group on the surface (Adma Nano YA010C-SM1 manufactured by Admatex Co., Ltd.), 89.9 parts by mass of methyl methacrylate (MMA) and 0.1 part by mass of AIBN (2,2'-azobisisobutyronitrile) as a polymerization initiator were mixed. Next, the obtained mixture was poured into a cell having a gap clearance of 6 mm composed of two glass plates and a soft polyvinyl chloride gasket, and the mixture was polymerized by heating in a polymerization tank using air as a heat medium at 60° C. for 3 hours, then at 120° C. for 40 minutes, to obtain a plate-like methacrylic resin (Tg: 114° C., the amount of silica particle residue: 10.6% by mass) having a thickness of 6 mm.

(2) Production of Molded Article by Stretching

A 100 μm thick polypropylene sheet was placed on Kapton film (500H, 125 μm thick, manufactured by Toray DuPont Co., Ltd.), and a sample cut out from the methacrylic resin obtained in above (1) to a size of 60 mm×60 mm was placed thereon. Further, a polypropylene sheet with a thickness of 100 μm was plated on the sample, and the Kapton film coated with a lubricant (KF96SP manufactured by Shin-Etsu Silicone Co.) was placed so that the lubricant-coated surface was in contact with the polypropylene sheet, and heated in a thermostat bath of 140° C. for 40 minutes. Next, it was press-stretched to a thickness of 3 mm using a press (single-acting compression molding machine NSF-70 type manufactured by Shinto Metal Industries, Ltd.; clamping pressure: 70 tons) in which the die was heated to 140° C. (stretching temperature: 140° C.). Immediately after stretching, water was passed through the die of the press to cool the die, and it was cooled down to 50° C. over approximately 6 minutes while applying press load. The sample cooled down to 50° C. was removed, to obtain a molded article.

The degree of orientation in the thickness direction, the sum of the component fractions of the two components different in T2, the flexural modulus and the impact resistance of the obtained molded article were evaluated. The results are shown in Table 1. The average primary particle diameter and the use amount of the silica particles used, and the stretching conditions of the methacrylic resin are shown in Table 1 collectively (the same shall apply also to the following examples and comparative examples).

Example 2

A plate-like methacrylic resin having a thickness of 6 mm (Tg: 117° C., the amount of silica particle residue: 21.2% by mass) was obtained in the same manner as in Example 1 (1), except that 20 parts by mass of silica particles having an average primary particle diameter of 10 nm and comprising a methacryloyl group on the surface (Adma Nano YA010C-SM1 manufactured by Admatex Co., Ltd.), 79.9 parts by mass of methyl methacrylate (MMA) and 0.1 part by mass of AIBN (2,2'-azobisisobutyronitrile) as a polymerization initiator were used.

A molded article was obtained in the same manner as in Example 1 (2) using the obtained methacrylic resin.

The degree of orientation in the thickness direction, the sum of the component fractions of the two components different in T2, the flexural modulus and the impact resistance of the obtained molded article were evaluated. The results are shown in Table 1.

Example 3

A plate-like methacrylic resin having a thickness of 8 mm (Tg: 117° C., the amount of silica particle residue: 21.2% by mass) was obtained in the same manner as in Example 2, except that a cell having a gap clearance of 8 mm constituted of two glass plates and a soft polyvinyl chloride gasket was used. Then, a molded article was obtained (press-stretched to a thickness of 3 mm) in the same manner as in Example 2, except that this methacrylic resin was used.

The degree of orientation in the thickness direction, the sum of the component fractions of the two components different in T2, the flexural modulus and the impact resistance of the obtained molded article were evaluated. The results are shown in Table 1.

Example 4

A plate-like methacrylic resin having a thickness of 10 mm (Tg: 117° C., the amount of silica particle residue: 21.3% by mass) was obtained in the same manner as in Example 2, except that a cell having a gap clearance of 10 mm constituted of two glass plates and a soft polyvinyl chloride gasket was used. Then, a molded article was obtained (press-stretched to a thickness of 3 mm) in the same manner as in Example 2, except that this methacrylic resin was used.

The degree of orientation in the thickness direction, the sum of the component fractions of the two components different in T2, the flexural modulus and the impact resistance of the obtained molded article were evaluated. The results are shown in Table 1.

Example 5

A plate-like methacrylic resin having a thickness of 6 mm was obtained in the same manner as in Example 1 (1). A molded article was obtained in the same manner as in Example 1 except that the temperature of the thermostat bath and the die temperature in Example 1 (2) were set to 80° C. using the obtained methacrylic resin (stretching temperature: 80° C.).

The degree of orientation in the thickness direction, the sum of the component fractions of the two components different in T2, the elastic modulus and the impact resistance of the obtained molded article were evaluated. The results are shown in Table 1.

Example 6

A plate-like methacrylic resin having a thickness of 6 mm (Tg: 120° C., the amount of silica particle residue: 29.9% by mass) was obtained in the same manner as in Example 1 (1), except that 20 parts by mass of silica particles having an average primary particle diameter of 50 nm and comprising a methacryloyl group on the surface (Adma Nano YA050C-SM1 manufactured by Admatex Co., Ltd.), 69.9 parts by mass of methyl methacrylate (MMA) and 0.1 part by mass of AIBN (2,2'-azobisisobutyronitrile) as a polymerization initiator were used. Then, a molded article was obtained in the same manner as in Example 1 (2) using the obtained methacrylic resin.

The degree of orientation in the thickness direction, the sum of the component fractions of the two components different in T2, the flexural modulus and the impact resistance of the obtained molded article were evaluated. The results are shown in Table 1.

Example 7

A plate-like methacrylic resin having a thickness of 10 mm (Tg: 120° C., the amount of silica particle residue: 29.9% by mass) was obtained in the same manner as in Example 6, except that a cell having a gap clearance of 10 mm constituted of two glass plates and a soft polyvinyl chloride gasket was used. Then, a molded article was obtained (press-stretched to a thickness of 3 mm) in the same manner as in Example 6, except that this methacrylic resin was used.

The degree of orientation in the thickness direction, the sum of the component fractions of the two components different in T2, the flexural modulus and the impact resistance of the obtained molded article were evaluated. The results are shown in Table 1.

Example 8

A plate-like methacrylic resin having a thickness of 10 mm was obtained in the same manner as in Example 1 (1), except that 10 parts by mass of silica particles having an average primary particle diameter of 50 nm and comprising a methacryloyl group on the surface (Adma Nano YA050C-SM1 manufactured by Admatex Co., Ltd.), 99.9 parts by mass of methyl methacrylate (MMA) and 0.1 part by mass of AIBN (2,2'-azobisisobutyronitrile) as a polymerization initiator were used, and a cell having a gap clearance of 10 mm constituted of two glass plates and a soft polyvinyl chloride gasket was used. Then, a molded article was obtained in the same manner as in Example 1 (2) except that the temperature of the thermostat bath and the die temperature were set to 100° C. using the obtained methacrylic resin (stretching temperature: 100° C.).

The degree of orientation in the thickness direction, the sum of the component fractions of the two components different in T2, the flexural modulus and the impact resistance of the obtained molded article were evaluated. The results are shown in Table 1.

Example 9

A methacrylic resin (Tg: 114° C., the amount of silica particle residue: 4.9% by mass) was obtained in the same manner as in Example 1 (1), except that 5 parts by mass of silica particles having an average primary particle diameter of 10 nm and comprising a methacryloyl group on the surface (Adma Nano YA010C-SM1 manufactured by Admatex Co., Ltd.), 94.9 parts by mass of methyl methacrylate (MMA) and 0.1 part by mass of AIBN (2,2'-azobisisobutyronitrile) as a polymerization initiator were used.

A molded article was obtained in the same manner as in Example 1 (2) using the obtained methacrylic resin.

The degree of orientation in the thickness direction, the sum of the component fractions of the two components different in T2, the flexural modulus and the impact resistance of the obtained molded article were evaluated. The results are shown in Table 1.

Example 10

A plate-like methacrylic resin having a thickness of 4 mm (Tg: 114° C., the amount of silica particle residue: 9.9% by mass) was obtained in the same manner as in Example 1 (1), except that 10 parts by mass of silica particles having an average primary particle diameter of 10 nm and comprising a methacryloyl group on the surface (Adma Nano YA010C-SM1 manufactured by Admatex Co., Ltd.), 89.9 parts by mass of methyl methacrylate (MMA) and 0.1 part by mass of AIBN (2,2'-azobisisobutyronitrile) as a polymerization initiator were used, and a cell having a gap clearance of 4 mm constituted of two glass plates and a soft polyvinyl chloride gasket was used.

A molded article was obtained in the same manner as in Example 1 except that the temperature of the thermostat bath and the die temperature in Example 1 (2) were set to 180° C. using the obtained methacrylic resin (stretching temperature: 180° C., press-stretched to a thickness of 3 mm).

The degree of orientation in the thickness direction, the sum of the component fractions of the two components different in T2, the flexural modulus and the impact resistance of the obtained molded article were evaluated. The results are shown in Table 1.

Comparative Example 1

A plate-like methacrylic resin having a thickness of 6 mm (Tg: 114° C., the amount of silica particle residue: 0% by mass) was obtained in the same manner as in Example 1 (1), except that silica particles were no used.

A molded article was obtained in the same manner as in Example 1 (2) using the obtained methacrylic resin.

The degree of orientation in the thickness direction, the sum of the component fractions of the two components different in T2, the flexural modulus and the impact resistance of the obtained molded article were evaluated. The results are shown in Table 1.

Comparative Example 2

A plate-like methacrylic resin having a thickness of 10 mm (Tg: 114° C., the amount of silica particle residue: 0% by mass) was obtained in the same manner as in Example 1 (1), except that a cell having a gap clearance of 10 mm constituted of two glass plates and a soft polyvinyl chloride gasket was used.

A molded article was obtained in the same manner as in Example 1 (2) using the obtained methacrylic resin.

The degree of orientation in the thickness direction, the sum of the component fractions of the two components different in T2, the flexural modulus and the impact resistance of the obtained molded article were evaluated. The results are shown in Table 1.

Comparative Example 3

Ninety nine point nine (99.9) parts by mass of methyl methacrylate (MMA) and 0.1 part by mass of AIBN (2,2'-azobisisobutyronitrile) as a polymerization initiator were mixed. Next, the obtained mixture was poured into a cell having a gap clearance of 3 mm composed of two glass plates and a soft polyvinyl chloride gasket, and the mixture was polymerized by heating in a polymerization tank using air as a heat medium at 60° C. for 3 hours, then at 120° C. for 40 minutes, to obtain a plate-like methacrylic resin (Tg: 114° C., the amount of silica particle residue: 0% by mass) having a thickness of 3 mm.

The degree of orientation in the thickness direction, the sum of the component fractions of the two components different in T2, the flexural modulus and the impact resistance of the obtained methacrylic resin were evaluated. The results are shown in Table 1.

Comparative Example 4

A plate-like methacrylic resin having a thickness of 3 mm (Tg: 118° C., the amount of silica particle residue: 32.0% by mass) was obtained in the same manner as in Comparative Example 3, except that 30 parts by mass of silica particles having an average primary particle diameter of 10 nm and comprising a methacryloyl group on the surface (Adma Nano YA010C-SM1 manufactured by Admatex Co., Ltd.), 69.9 parts by mass of methyl methacrylate (MMA) and 0.1 part by mass of AIBN (2,2 '-azobisisobutyronitrile) as a polymerization initiator were used.

The degree of orientation in the thickness direction, the sum of the component fractions of the two components different in T2, the flexural modulus and the impact resistance of the obtained methacrylic resin were evaluated. The results are shown in Table 1.

TABLE 1

| | silica particle | | stretching condition | | degree of orientation in | absolute value of degree of orientation | sum of component fractions of two | | |
|---|---|---|---|---|---|---|---|---|---|
| | Average primary particle diameter (mm) | use amount (parts by mass) | temperature (° C.) | ratio (times) | thickness direction | in thickness direction | components (%) | flexural modulus (Mpa) | impact resistance (kJ/m$^2$) |
| Example 1 | 10 | 10 | 140 | 2.0 | 0.07 | 0.07 | 8 | 3700 | 57 |
| Example 2 | 10 | 20 | 140 | 2.0 | −0.06 | 0.06 | 38 | 4000 | 33 |
| Example 3 | 10 | 20 | 140 | 2.7 | −0.07 | 0.07 | 38 | 4000 | 26 |
| Example 4 | 10 | 20 | 140 | 3.3 | −0.10 | 0.10 | 38 | 4000 | 39 |
| Example 5 | 10 | 10 | 80 | 2.0 | −0.24 | 0.24 | 42 | 4100 | 56 |
| Example 6 | 50 | 20 | 140 | 2.0 | −0.07 | 0.07 | 20 | 4000 | 35 |
| Example 7 | 50 | 20 | 140 | 3.3 | −0.11 | 0.11 | 33 | 4100 | 32 |
| Example 8 | 50 | 10 | 100 | 3.3 | −0.20 | 0.20 | 27 | 4000 | 30 |
| Example 9 | 10 | 5 | 140 | 2.0 | 0.07 | 0.07 | 4 | 3400 | 50 |
| Example 10 | 10 | 10 | 180 | 1.3 | 0.04 | 0.04 | 8 | 3400 | 34 |
| Comparative Example 1 | — | — | 140 | 2.0 | −0.07 | 0.07 | 0 | 3200 | 40 |
| Comparative Example 2 | — | — | 140 | 3.3 | −0.12 | 0.12 | 0 | 3200 | >80 |
| Comparative Example 3 | — | — | — | — | 0 | 0 | 0 | 3100 | 16 |
| Comparative Example 4 | 10 | 30 | — | — | 0 | 0 | 32 | 4000 | 4.7 |

In Table 1, ">80" means that the average of the evaluation results excluding the unbroken samples among the five test samples is 80 kJ/m$^2$, and the Charpy impact strength of this sample is greater than 80 kJ/m$^2$.

The invention claimed is:

1. A molded article comprising a resin, wherein
said resin comprises a methacrylic resin comprising a structural unit derived from a methacrylic acid ester and a structural unit derived from a silica particle having an average primary particle diameter of 1 nm or more and 50 nm or less and comprising at least one polymerizable functional group, and
said molded article has an absolute value of degree of orientation in the thickness direction of 0.02 or more and satisfies the following requirement (I):
(I) When the free induction decay curve (X) obtained by measuring the molded article by a solid echo method at 150° C. using a pulse nuclear magnetic resonance measurement apparatus is approximated by the least square method using the following formula (F1), the sum (B+C) of the component fractions of two components having different spin-spin relaxation times in the free induction decay curve (X) is 4% or more:

$$M(t)=A \times MA(t)+B \times \exp(-t/T2_B)+C \times \exp(-t/T2_C) \quad \text{formula (F1)}$$

in the formula (F1),
B and C represent the respective component fractions of two components having different spin-spin relaxation times in the free induction decay curve (X),
$T2_B$ and $T2_C$ ($T2_B > T2_C$) represent respective spin-spin relaxation times in the two components, and t represents the decay time,
A represents the component fraction of a component corresponding to the free induction decay curve (Y) obtained by separately measuring a molded article comprising a methacrylic polymer not comprising said structural unit derived from a silica particle by a solid echo method at 150° C. using said pulse nuclear magnetic resonance measurement apparatus,
MA (t) represents the macroscopic magnetization of the free induction decay curve (Y), and
the component fractions A, B and C respectively represent percentages of respective components to the sum of A, B and C.

2. The molded article according to claim 1, wherein said polymerizable functional group is at least one group selected from the group consisting of a methacryloyl group, an acryloyl group, a styryl group, an α-methylstyryl group and an itaconyl group.

3. A method of producing the molded article of claim 1, comprising
a step of polymerizing the methacrylic acid ester and the silica particle to produce the methacrylic resin, and
a step of stretching the methacrylic resin, wherein the stretching ratio in the thickness direction (thickness before stretching/thickness after stretching) is 1.8 times or more and 4.0 times or less.

4. The method of producing the molded article according to claim 3, wherein the amount of the silica particle used is 5 parts by mass or more with respect to 100 parts by mass of the methacrylic acid ester.

5. An automotive material comprising the molded article according to claim 1.

6. A display window protective plate comprising the molded article according to claim 1.

7. The molded article according to claim 1, wherein the content of said structural unit derived from said silica particle is 7 parts by mass or more, with respect to 100 parts by mass of said structural unit derived from a methacrylic acid ester.

8. The molded article according to claim 7, wherein the content of said structural unit derived from said silica particle is 10 parts by mass or more, with respect to 100 parts by mass of said structural unit derived from a methacrylic acid ester.

9. The molded article according to claim 1, wherein said absolute value of degree of orientation in the thickness direction is more than 0.04.

* * * * *